Nov. 9, 1965

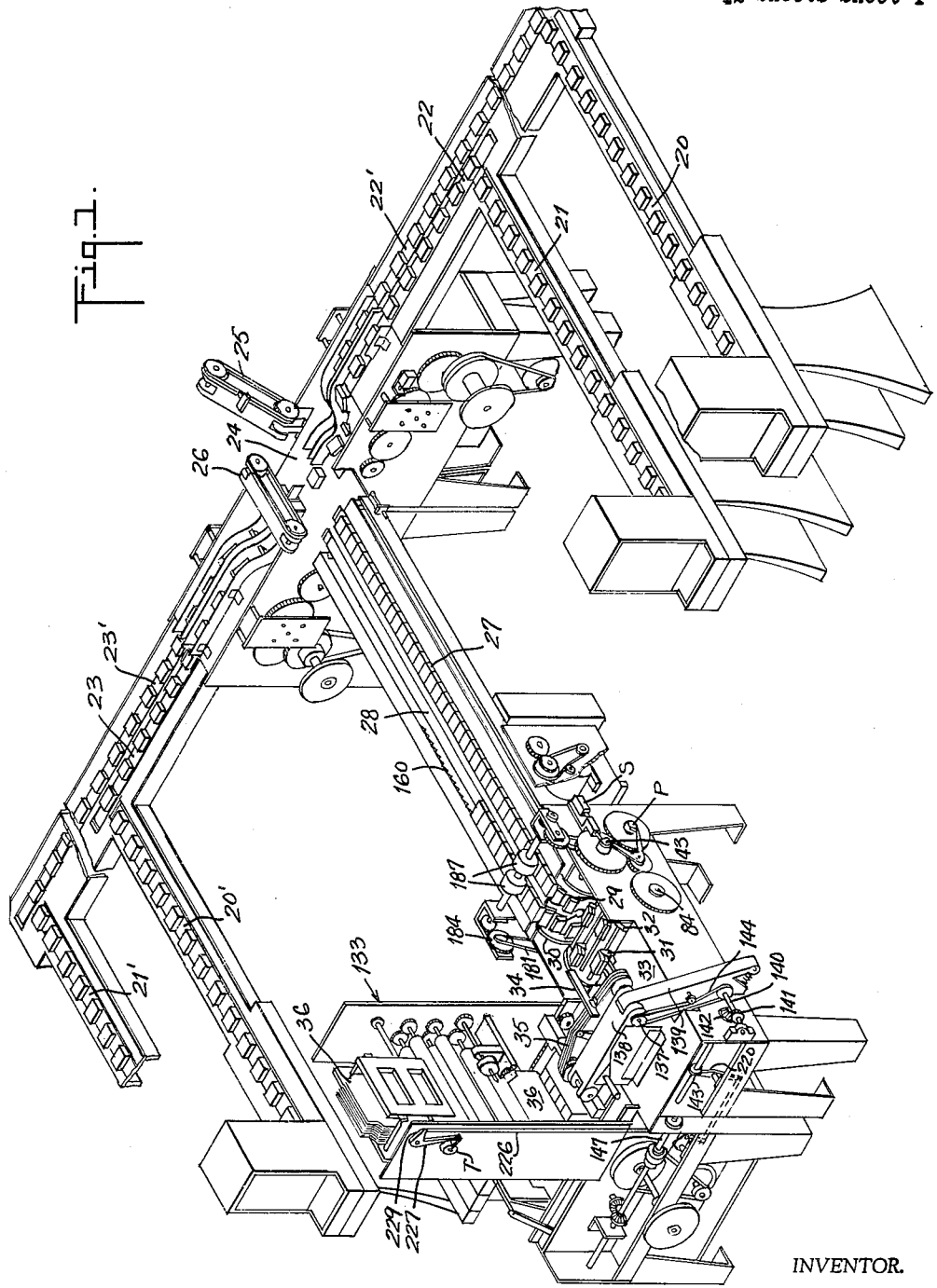

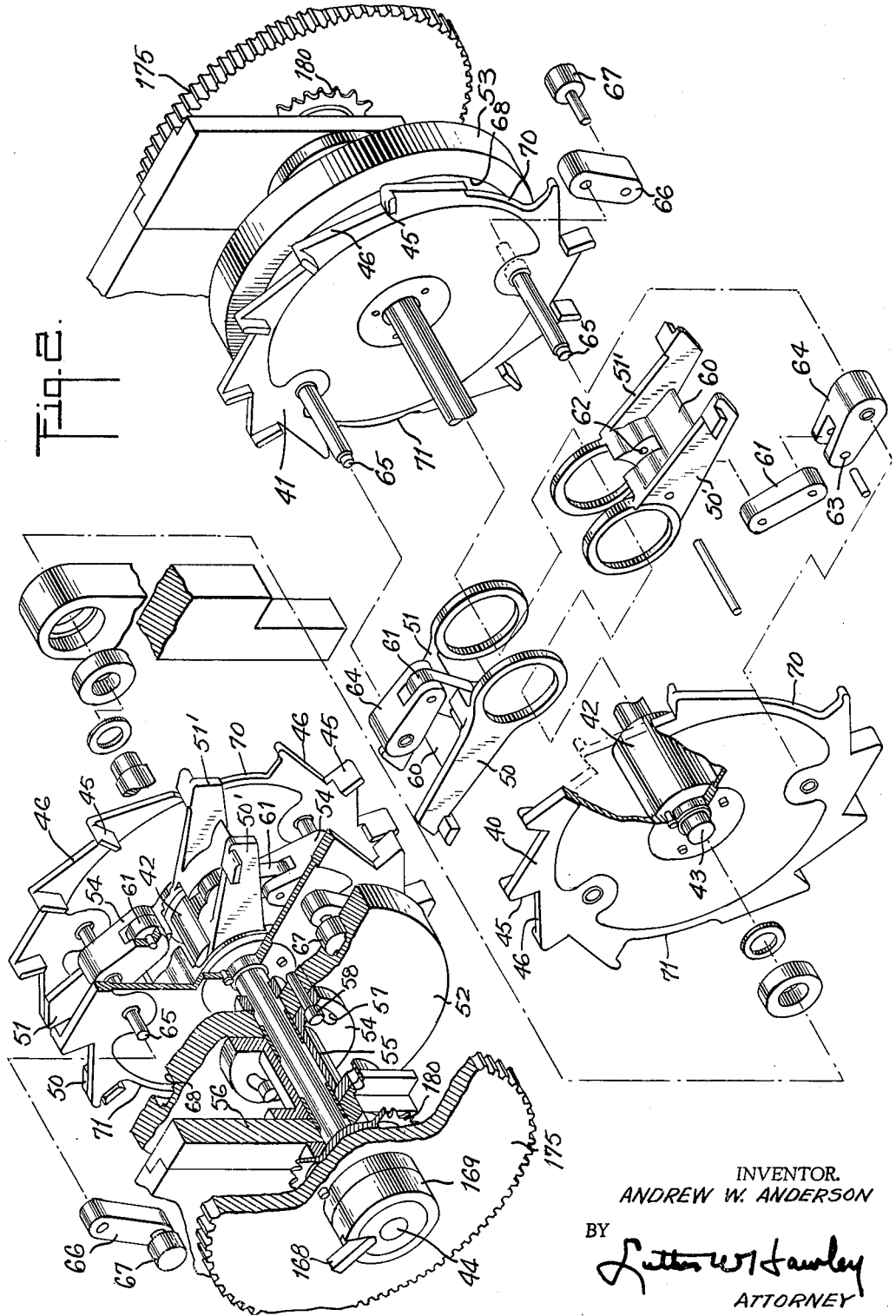

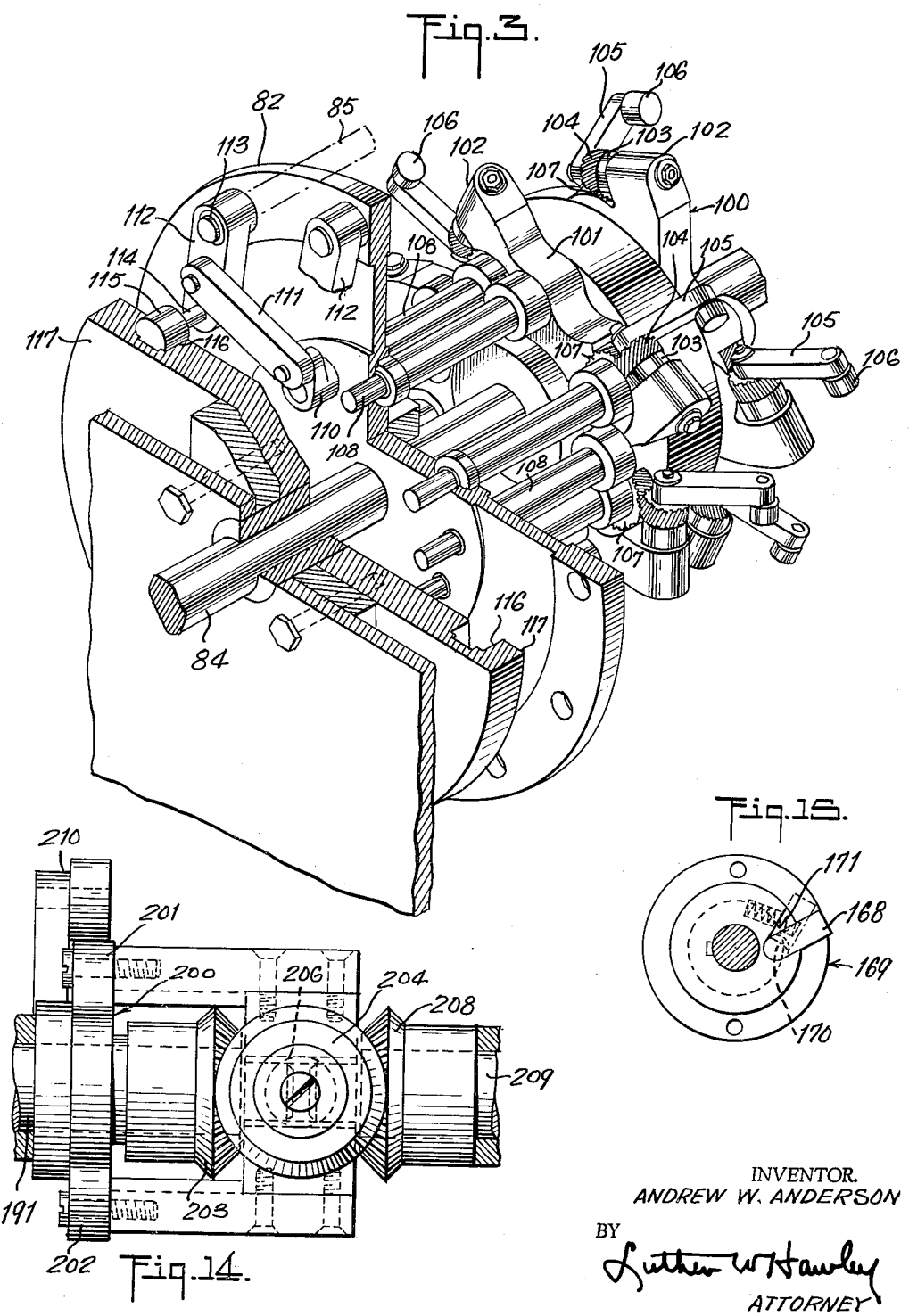

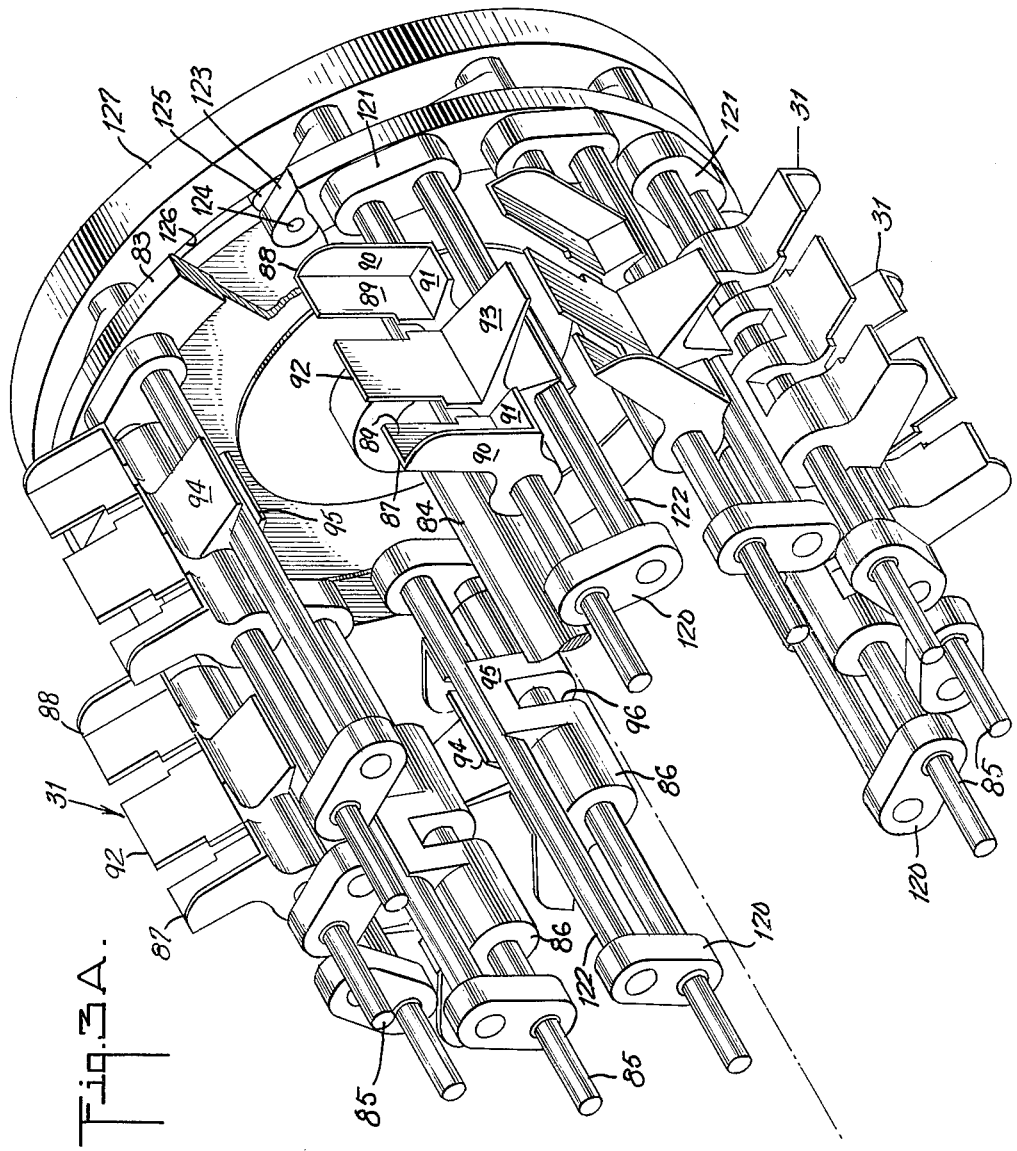

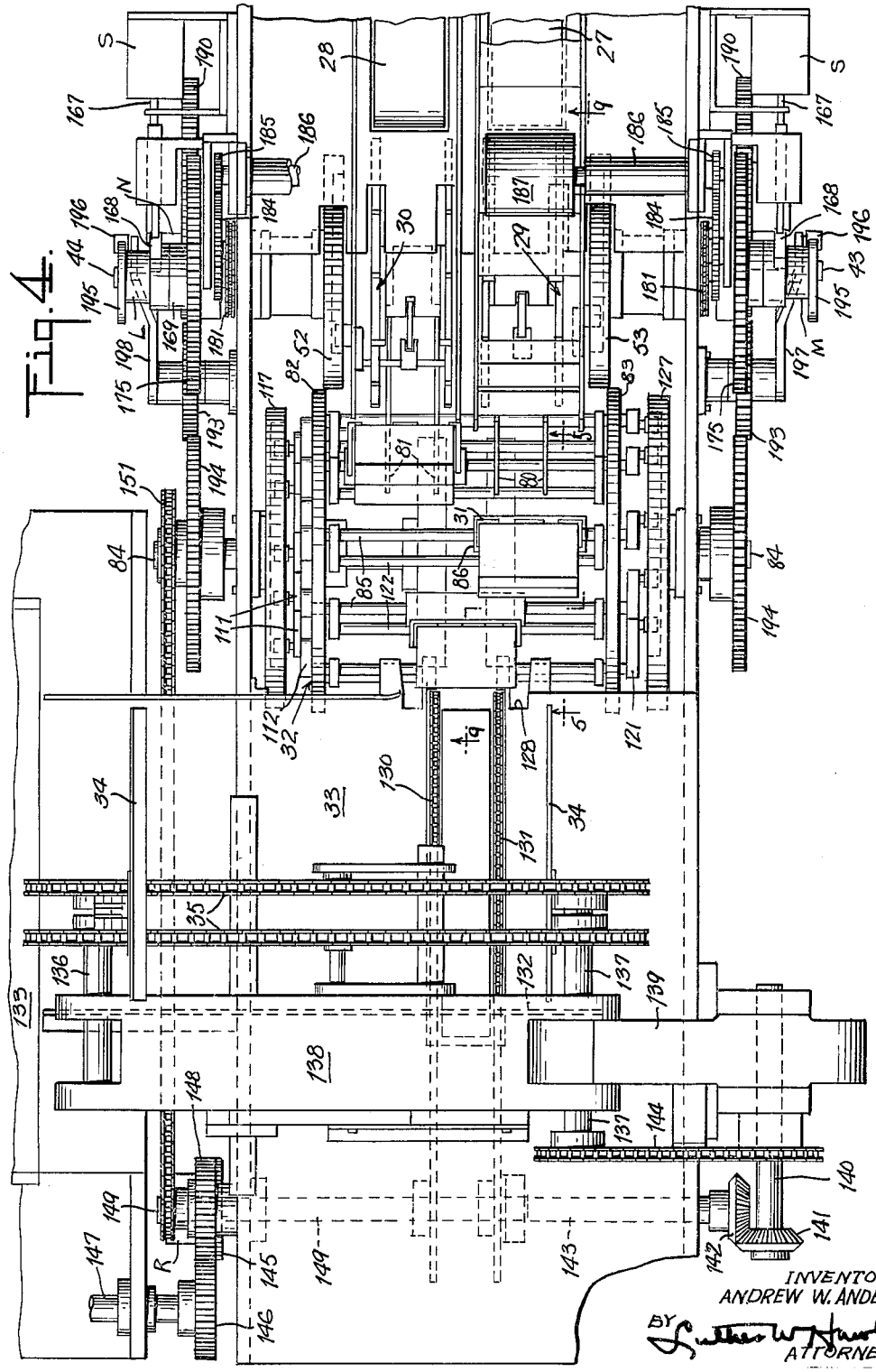

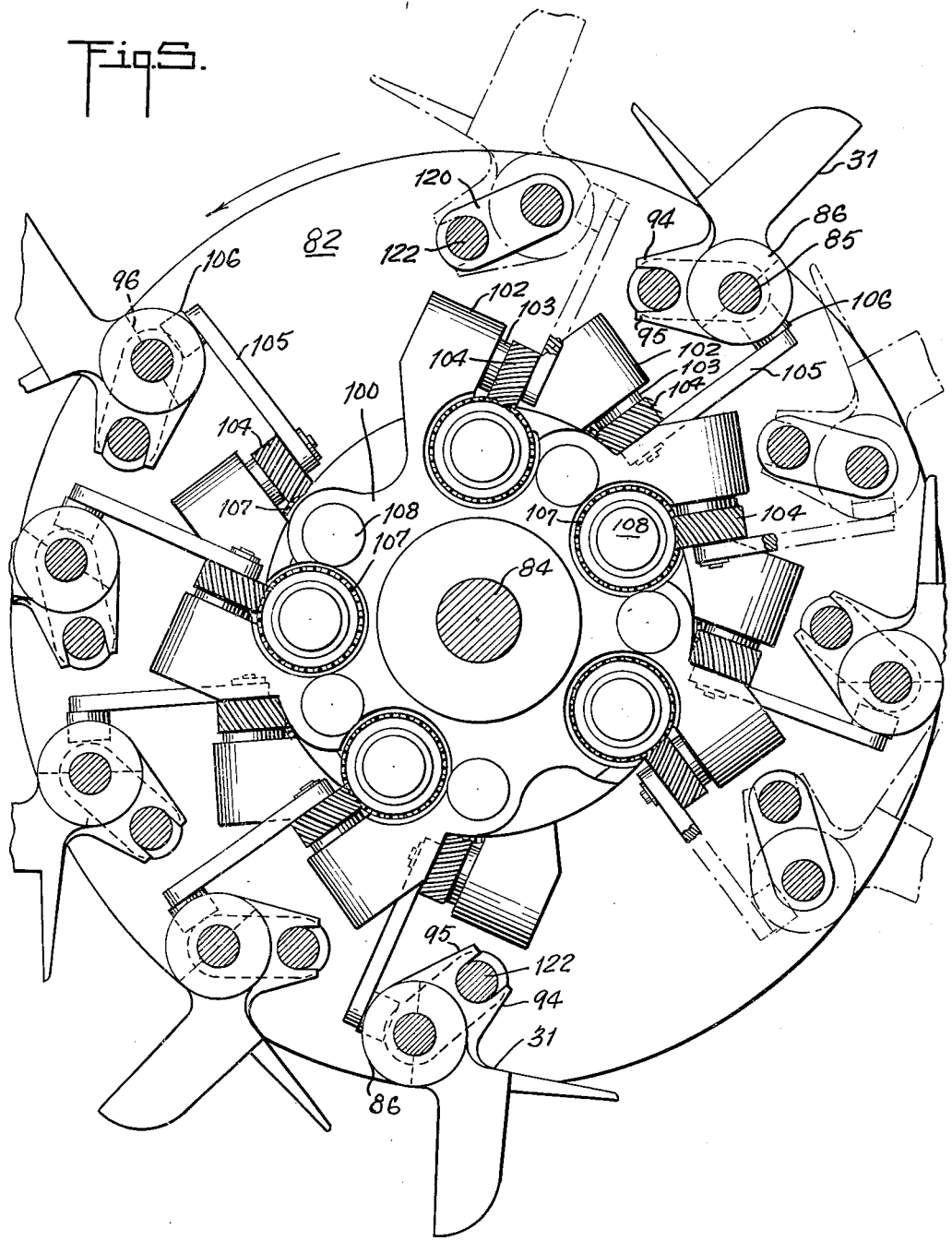

A. W. ANDERSON 3,216,173

COLLATING MACHINES

Filed May 17, 1962

INVENTOR.
ANDREW W. ANDERSON
BY
*Luther W Hawley*
ATTORNEY

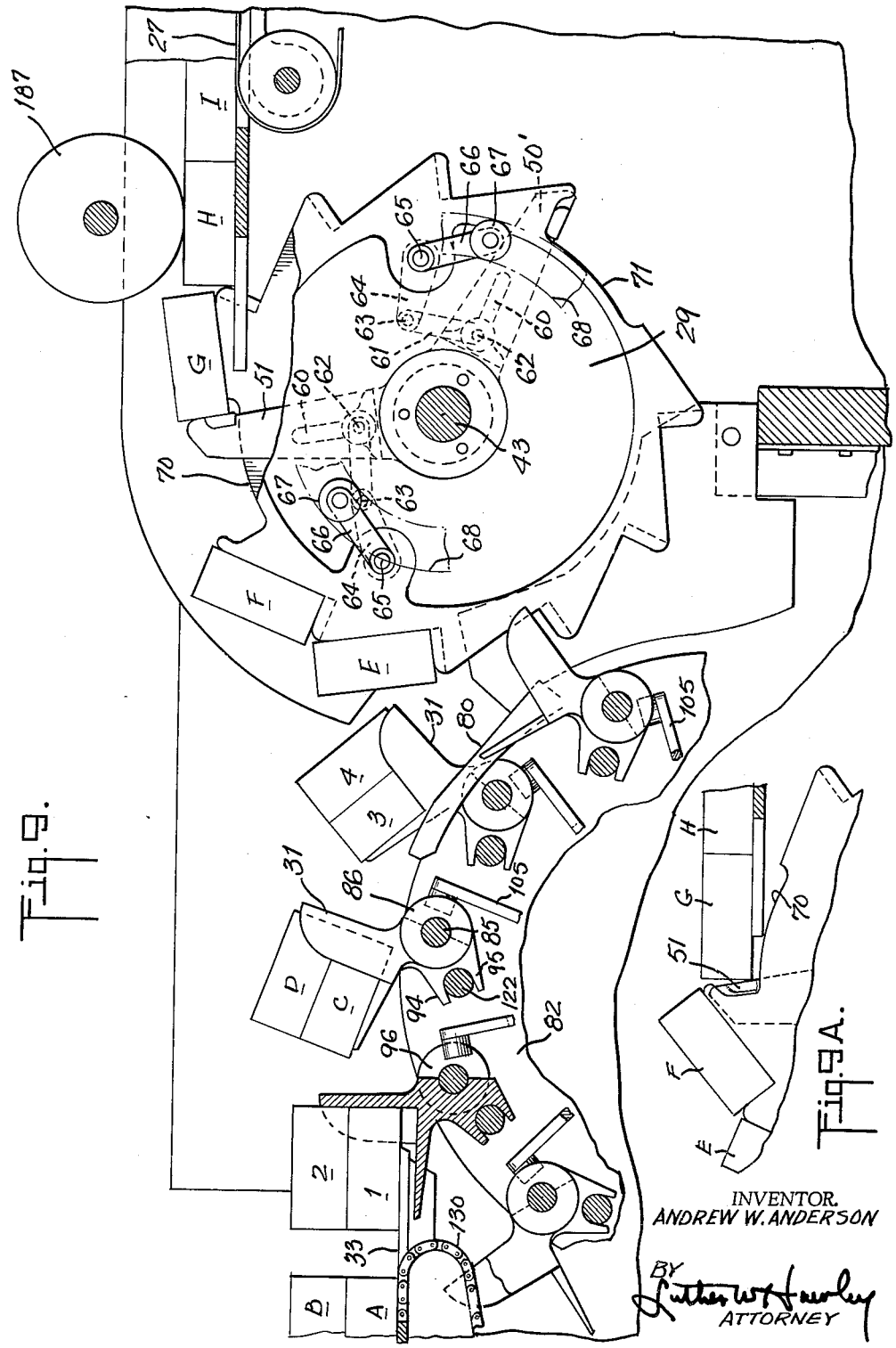

Nov. 9, 1965  A. W. ANDERSON  3,216,173
COLLATING MACHINES
Filed May 17, 1962  12 Sheets-Sheet 10

INVENTOR.
ANDREW W. ANDERSON
BY
ATTORNEY

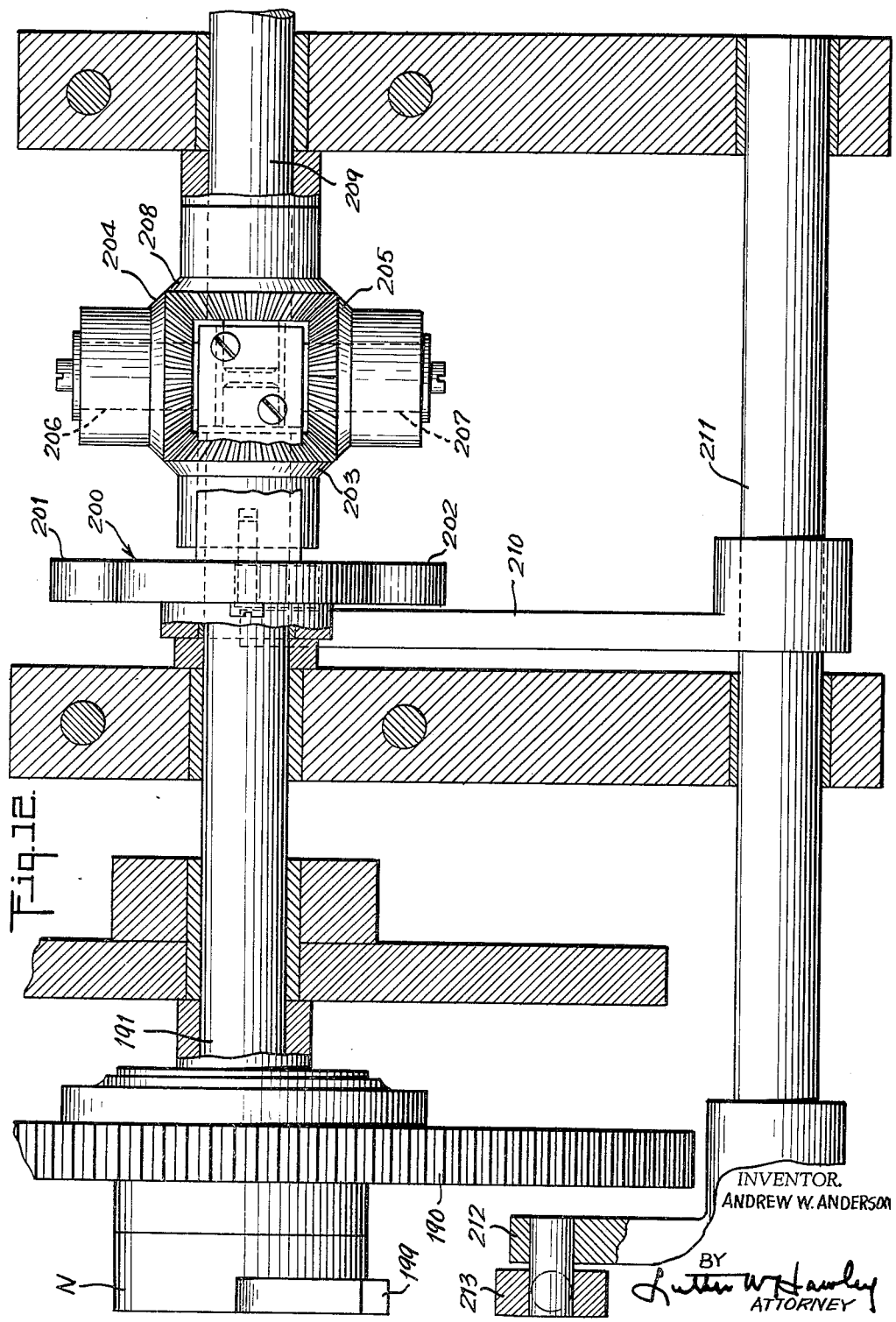

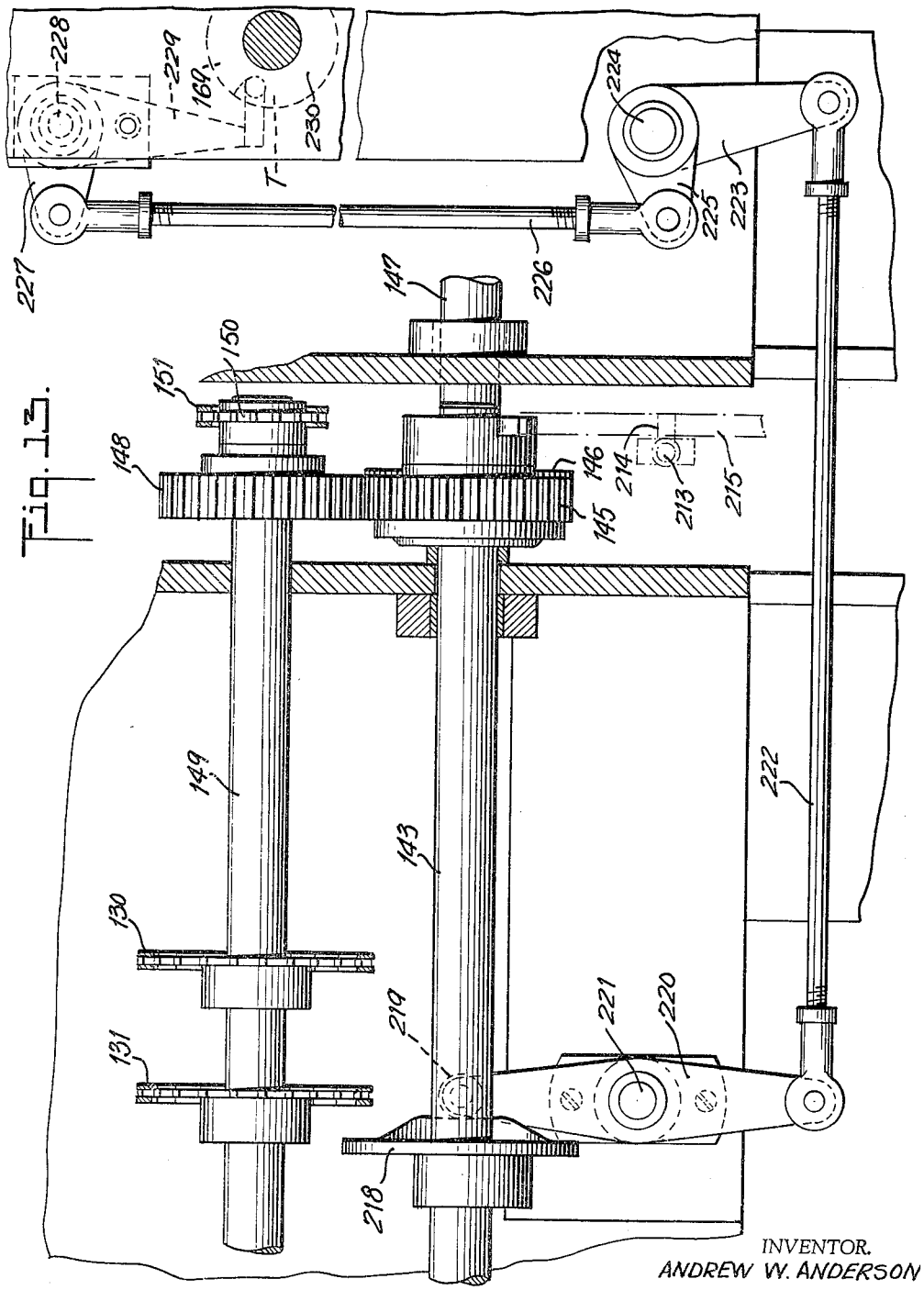

United States Patent Office 3,216,173
Patented Nov. 9, 1965

3,216,173
COLLATING MACHINES
Andrew W. Anderson, West Caldwell, N.J., assignor to Scandia Packaging Machinery Company, North Arlington, N.J., a corporation of New Jersey
Filed May 17, 1962, Ser. No. 195,559
7 Claims. (Cl. 53—60)

This invention relates to a collating machine for feeding, assembling, stacking, and delivering stacks of articles or packages to a boxing or cartoning machine.

The invention has for its salient object to provide a practical and efficient machine for receiving and feeding packages from a plurality of wrapping machines and delivering said packages assembled or grouped and stacked to a boxing or cartoning machine.

Another object of the invention is to provide a machine of the character described having means for controlling the operations of a plurality of sequential feeding mechanism when the delivery of packages thereto is interrupted.

Another object of the invention is to provide a machine having means for receiving and feeding packages from a plurality of conveyors and alining the packages in stacked relation side by side.

Another object of the invention is to provide a machine having a plurality of package delivery conveyors, means for receiving and stacking said packages, means for feeding said stacked packages to a cartoning machine, and means for controlling the operation of said feeding, stacking and delivery mechanisms when the delivery of packages by one of the conveyors is interrupted.

Further objects of the invention will appear from the following specification taken in connection with the drawings which form a part of this application, and in which:

FIG. 1 is a perspective plan view of a machine constructed in accordance with the invention;

FIG. 2 is an exploded perspective view of the feed wheels which receive and feed the packages delivered by a pair of conveyors;

FIG. 3 is a perspective elevational view, partly in section, showing one end portion of a wheel having pockets thereon for receiving the packages from the two delivery wheels shown in FIG. 2;

FIG. 3A is a perspective elevational view of the other end of the wheel shown in FIG. 3;

FIG. 4 is a top plan view of the feeding and delivery end of the machine shown in perspective in FIG. 1;

FIG. 5 is a sectional elevation taken substantially on line 5—5 of FIG. 4, looking in the direction of the arrows, and showing in an enlarged view the pocket wheel illustrated in FIGS. 3 and 3A;

FIG. 9 is a transverse sectional elevation, on an enlarged scale, showing the wheels which receive the packages from the conveyors, stack the packages one on top of the other, and deposit them in a row across a delivery table from which they are fed to the cartoning machine;

FIG. 9A is a fragmentary view of a portion of the wheel shown in FIG. 9, showing the movable arms in the position in which they form a stop for the package G but before the wheel has been rotated to the position in FIG. 9;

FIG. 12 is a sectional elevation taken substantially on line 12—12 of FIG. 11, looking in the direction of the arrows;

FIG. 13 is a sectional elevation taken substantially on line 13—13 of FIG. 11, looking in the direction of the arrows;

FIG. 14 is a plan view of the differential shown in FIG. 12; and

FIG. 15 is a sectional elevation of a one revolution clutch which is used to control the driving connections for the delivery wheels which receive the packages from the conveyors, for the connections which control the operation of a transverse feed which feeds the rows of stacked packages to the cartoning machine, and the operation of the blank feed which feeds the blanks in the cartoning machine.

Figure 6:
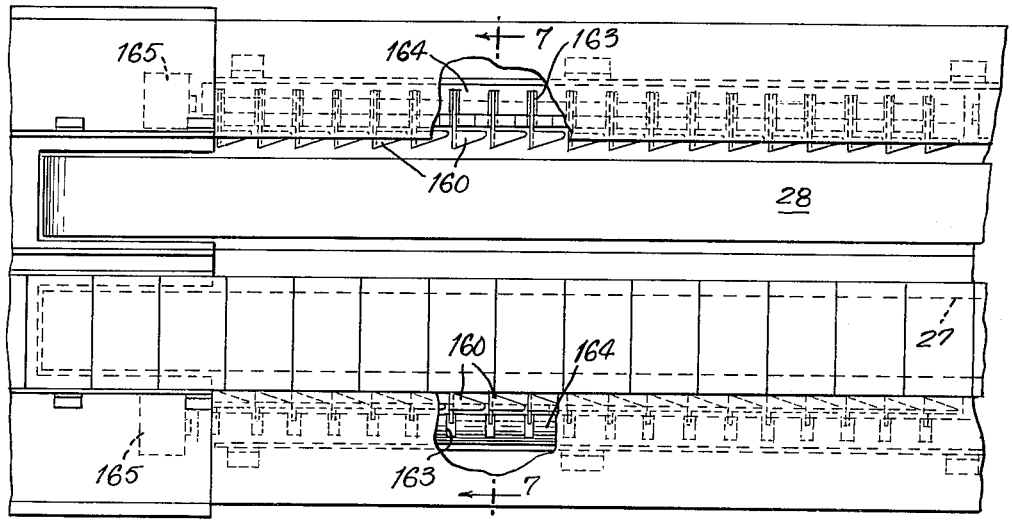
FIG. 6 is a plan view, partly broken away, showing the two conveyors which conduct the packages to the two sets of delivery wheels.

The invention, briefly described, consists of a machine comprising a pair of conveyors which receive packages from a plurality of packaging machines and deliver the packages to a pair of wheels, which in turn deliver the packages to peripherally arranged pockets on a third wheel, on which they are grouped, one on top of the other, and from which they are delivered in a single line in stacked relation to a delivery table. From the delivery table they are fed laterally to a cartoning machine. The conveyors are provided with feelers or detectors which are normally engaged by the articles or packages as they are fed by the conveyors. When the row of packages being fed is interrupted, the feelers operate through electric eye mechanism to successively control the operation of the feed wheel which receives the packages from the conveyor in which the continuous row has been interrupted and stop the operation of that wheel. Thereafter, the packages are fed by the other conveyor but due to the absence of the packages from the wheel which has been stopped from operating, the assembling of the stacked packages on the platform for feeding to the cartoning machine is slowed down and, therefore, the operation of the transverse feed is automatically controlled so that it operates only half of the time. Furthermore, the blank feed for the cartoning machine is also interrupted so that a blank will not be fed when no row of packages has been fed by the transverse feed and is ready to be fed against the blank and enclosed in the carton.

Further details of the invention will appear from the following description.

In FIG. 1 the entire machine is shown in perspective and the various parts may be briefly designated as follows. This view shows conveyors 20 and 21 and 20' and 21' which receive the packages from wrapping machines and feed them to conveyors 22 and 22' and 23 and 23' which operate at right angles to the initially mentioned conveyors. The conveyors 22 and 22' and 23 and 23' deliver the packages to a table 24, from which they are fed by transverse feed chains 25 and 26 to a pair of conveyors 27 and 28. The conveyors 27 and 28 deliver the packages or articles to a pair of feed wheels 29 and 30, by which they are delivered to pockets 31 in a feed wheel 32. The pockets are moved transversely to a central position on the feed wheel 32 and deliver the stacked articles to a table 33, from which they are fed laterally by plates or feed bars 34 carried by chains 35 to the cartoning machine. This machine carries blanks 36 which are fed downwardly vertically into the path of the rows of stacked packages or articles.

Figure 10:
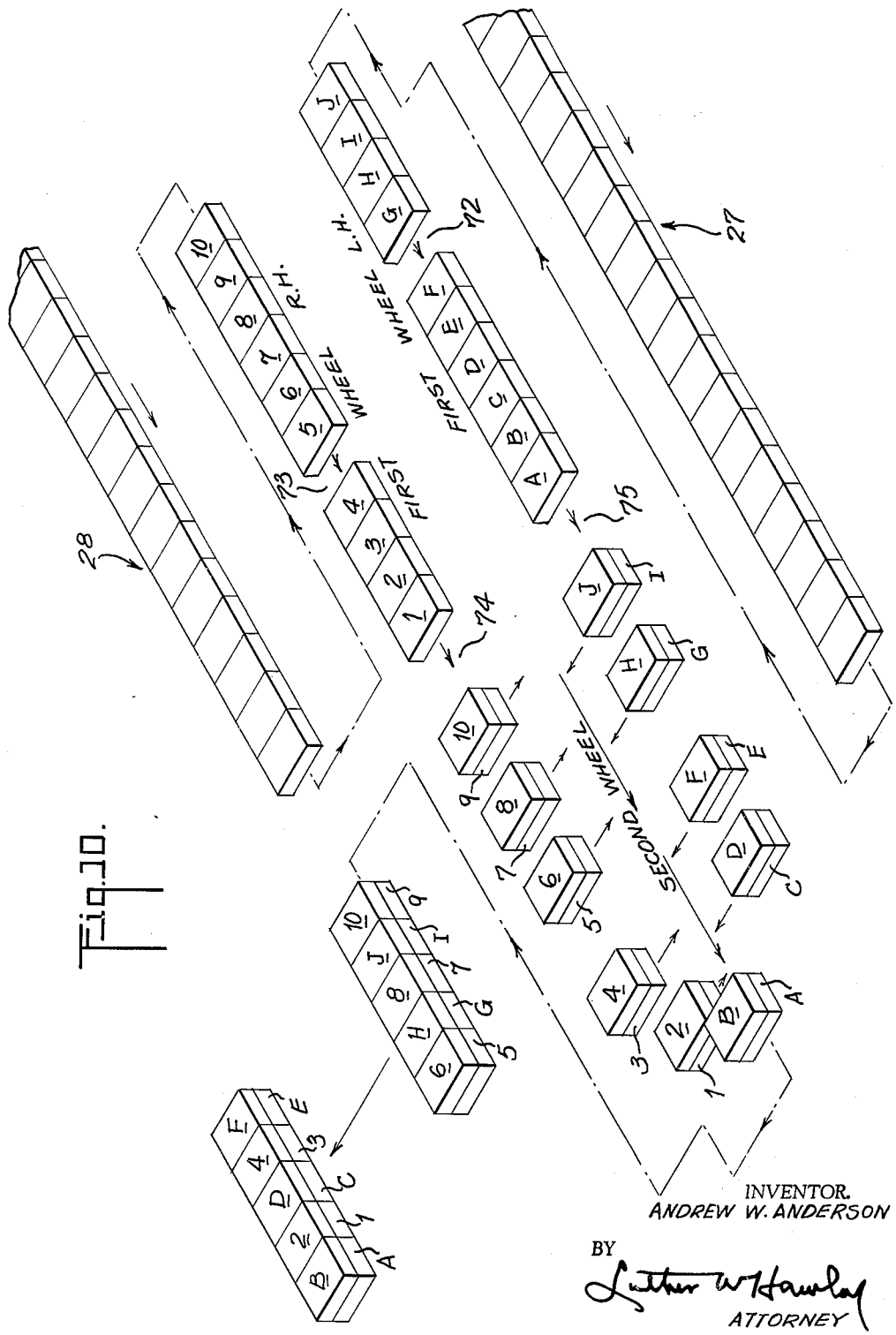
FIG. 10 is a perspective plan view showing the manner in which the packages are delivered by the conveyors, are grouped, and are alined across the delivery table.

Before describing the details of the feed wheels and pocket wheel, attention is directed to FIG. 10, which shows diagrammatically the manner in which the articles or packages from the conveyors 27 and 28 are fed and grouped by the feed wheels to the pocket wheel. In considering this diagrammatic showing, it should be understood that the packages are superposed into pairs when they are delivered from the feed wheels to the pockets on the pocket wheel and when the packages are delivered from the feed wheels, pockets are disposed in alinement with the respective wheels to receive the packages. These pockets are then fed laterally to a central position, or, in other words, the pockets which receive the pairs of packages from the left hand wheel, viewing FIG. 10, are fed to the right in the direction of travel thereof, and the pockets which receive the packages from the right hand wheel are moved to the left so that five pairs of packages will be deposited in alinement from the pockets onto the table 33. In order to accomplish this, the pairs are grouped in the manner illustrated, and the packages in the left hand wheel are designated by letters and those in the right hand wheel by numbers. It will be noted that packages A and B from the left hand wheel have been moved to a central position and packages 1 and 2 from the right hand wheel are in process of being moved in the rear of the packages A and B. Thereafter, packages C and D from the left hand wheel will move to the right in back of the packages 1 and 2 and packages 3 and 4 from the right hand wheel will move in back of the packages C and D. To complete the first group of 10 packages, the packages E and F move in back of the packages 3 and 4 to complete the group which is shown at the top left hand end of the figure.

In order to so group the packages the right hand wheel feeds packages 1, 2, 3, 4, or, in other words, feeds four packages, and the left hand wheel feeds six packages A, B, C, D, E and F. After the first group has been fed to the able 33, which carries feed chains hereinafter described, this group is removed by means of the transverse bar 34 on the transverse feed chains 35 from the table and is moved into the cartoning machine.

In order to provide time for this removal of the completed group, the feeding of the packages for the second group is spaced in a manner hereinafter described and as shown in FIG. 10. The second group is made up of packages 5, 6, 7, 8, 9 and 10 from the right hand wheel and packages G, H, I and J from the left hand wheel. This is accomplished in a manner which will be described in connection with the construction and operation of the two feed wheels 29 and 30.

*Construction and operation of first feed wheels*

Attention is directed particularly to FIGS. 1, 2, 4 and 9. The feed wheels 29 and 30 receive the packages from the conveyors 27 and 28 and deliver them to the pockets 31 on the wheel 32. Each of these wheels comprises a pair of plates 40 and 41 which are mounted on a hub 42, and each hub 42 is keyed to a shaft which is numbered 43 for the left hand wheel in FIG. 2 and 44 for the right hand wheel, it being understood that these shafts are separate and are separately driven and controlled for reasons hereinafter explained.

The two plates on each wheel are notched on their peripheries to provide a plurality of ledges 45 and inclined surfaces 46 which terminate in the ledges.

In order ot provide for feeding four packages from the right hand wheel and six from the left hand wheel in the manner above explained in connection with FIG. 10 and thereafter six packages from the right hand wheel and four packages from the left hand wheel, means must be provided for varying or regulating the number of ledges in the two wheels to feed the proper number of packages thereby.

This is accomplished by providing on each wheel two pairs of arms 50 and 51, which are rotatably mounted on the hubs 42 and are cam controlled by means of fixed cams 52 and 53 which are bolted in suitable manner to a flange 54 mounted on a sleeve 55, which in turn is fixedly secured to one of the side frames 56. As shown at the top in FIG. 2, the flange 54 has arcuate slots 57, and the bolts 58 which secure the cam to the flange can be adjusted to permit rotational adjustment of the cam position with reference to the flange 54.

In order to provide for the transverse feed of the rows of packages delivered to the table 33, the arms 50 and 51 are cam controlled in the following manner. The arms 50 and 51 of each pair are connected by a web 60 and a link 61 is pivoted at 62 to the connecting web and is pivoted at 63 at its other end to a link 64, and the other end of the link 64 is pivoted at 65 to an arm 66 which has a follower 67 disposed in a cam slot 68 in one of the cams 52 or 53. The cam is so designed as to actuate the arms 50, 51 during the rotation of the wheel in such a manner as to delay the feeding action of the wheel sufficiently to permit the transverse feed of the row just delivered to the table 33.

This action will be clear from a reference to FIG. 9, in which the packages have been numbered and lettered. In this figure it will be seen that packages A and B have been delivered to the table and packages 1, 2, C, D, and 3, 4 have been delivered to the pockets in the pocket wheel 32, and packages E, F are about to be delivered to the next pocket on the pocket wheel.

Each of the feed wheels, as shown in FIGS. 2 and 9, has provided in the periphery thereof, gaps or spaces 70 and 71, and at each of these spaces the movable arms 50 and 51 can be manipulated by the cams during the rotations of the wheels to provide an additional ledge for receiving packages from the conveyors. The operation of the holding arms 50, 51 will be clear from reference to FIG. 9A, wherein it will be seen that the arms have formed a ledge or stop for the package G, but as the wheel continues to rotate the cam will control the arms to hold them in the position shown in FIG. 9A until these arms are positioned at the other end of the space 70 which is shown in FIG. 9. In this manner the package G is held to create the space shown at 72 in FIG. 10 between the packages F and G. In the same manner the space 73 is created between the packages 4 and 5 in the other wheel. This space will correspond with the positioning of the pockets on the pocket wheel and provides time for the transverse feed on the table to remove an assembled group to the cartoning machine before the following group is started.

It will be noted that the surfaces 46 and ledges 45 on the feed wheels 29 and 30 are arranged in one group of six and one group of four, and are separated by spaces 70 and 71. The first ledge in the group of six and the first ledge in the group of four is not formed in the wheel proper but is provided by the movable arms 50 and 51 which move arcuately in space 70. In the normal rotation of the wheel 29, the arms 50 and 51 are positioned as shown in FIG. 9A, and the arms 50′ and 51′ are positioned as shown in FIG. 9. When the arms 50 and 51 are at the position shown in FIG. 9A, the cam action holds them at this position, as above stated, while the wheel continues to rotate, to the position shown in FIG. 9. Thus, as stated above, the arms hold a package, as G, through the space 70, and then continue their normal rotation until the package is delivered to the supports or platforms 80 or 81, at which time the cam action returns it to its original position. The arms 50′ and 51′ act identically for the group of four and at the same point. It will be understood that this action takes place on both feed wheels to provide the grouping shown in FIG. 10 and the spaces 72, 73, 74, 75. This spacing is increased when packages are placed on the pocket wheel, one on the other, as will be seen in the description of that wheel, and is necessary to provide time for the lateral feed to remove the completed group toward the cartoning machine before the next group starts to form.

*Pocket wheel*

The packages delivered by the feed wheels 29 and 30 are deposited on two sets of bars 80 and 81 which act as platforms to receive the packages as they are delivered by the wheels to be picked up by the pockets.

The pocket wheel comprises a pair of disks 82 and 83 which are mounted on and are rotatable with a shift 84 supported in the side frame of the machine.

There are mounted between the disks 82 and 83, a plurality of rods 85, on which are mounted the pockets 31. Each pocket is formed on a hub 86 and, as shown particularly in FIG. 3A, the hub has formed thereon end sections 87 and 88, each end section having a back plate 89, an end plate 90, and a base 91. In addition to the end plates 87 and 8, each pocket has a central portion comprising plates 92 and 93 disposed at right angles to each other. The plates 88 and 89 are spaced from the plate 92, as shown in FIG. 3A.

The hub 86 also has outwardly extending lugs 94 and 95, which form a bifurcated opening, and the hub also has a recess 96.

The pocket hubs are slidable on the rods 85 and there are two sets of pockets mounted on the rods 85, one set being adapted to receive the packages from the feed wheel 29 and the other set being adapted to receive the packages from the feed wheel 30. After the packages are received from the feed wheels, the pockets are moved laterally on the rods 85 to position them centrally on the pocket wheel 32 so that they will be delivered by the wheel on the platform 33 in a straight line. This is accomplished in the following manner, attention being directed particularly to FIGS. 3, 3A and 5.

Intermediate the disks 82 and 83 there are mounted on the shaft 84, a pair of disks 100 and 101, and each of these disks has offset lugs 102, in which are journaled stub shafts 103 having mounted thereon a spiral gear 104. Each stub shaft 103 has secured thereto an arm 105, on the outer end of which is mounted a roller 106, and each roller is positioned in the socket or recess 96 of one of the pockets P. Each spiral gear 104 is rotated by means of a spiral gear 107, and these spiral gears are carried by shafts 108. The shafts 108 are journaled at one end in one of the disks 100, 101 and at the other end in the disk 82. Each of the shafts 108 has secured to the outer end thereof a crank arm 110, which has pivoted thereto a link 111, the other end of this link being pivoted to a link 112 which is pivoted at 113 at one end thereof to the end of one of the shafts 85. The other end of the link 112 carries a pin 114, to which is secured a cam roller 115 which seats in a slot 116 in a fixed cam 117.

As the pocket wheel rotates, the cam 117, through its action on the cam roller 115 and the linkage connected thereto, will oscillate the arm 110 and thereby oscillate the shaft 108 and the spiral gear mounted thereon. The oscillation of the spiral gear will be communicated through the spiral gear 104 to the arm 105, thus moving the pocket controlled thereby laterally on its supporting rod 85 from the position in which it receives the packages from the feed wheel to the position in which the packages are delivered to the platform 33 to be fed transversely to the cartoning machine.

As the pockets move from receiving position to delivery position, they are tilted on the rods 85 in the following manner. Each of the rods 85 has fixedly mounted thereon, links 120 and 121, and rod 122 is mounted in the outer ends of the links 120 and 121 and extends through the lugs 94 and 95 which are carried by the hub. The outer ends of the rods 85 have secured thereto crank arms 123, on the outer ends of which are pins 124 which carry rollers 125. The rollers are positioned in a cam slot 126 in a cam 127 which is fixed against rotation. As the pocket wheel is rotated, the cams 127, through the arms 123 and rods 85, cause the pockets to tilt from the receiving position shown in FIG. 9 to the discharge position in which the pairs of packages are discharged from the pockets onto the platform 33. The platform is recessed, as shown at 128, to permit the passage of the pockets after they have discharged their load.

From the foregoing description it will be seen that the pockets P at the two ends of the pocket wheel receive the packages from the wheels 29 and 30, and by means of the cam control above described the pockets are moved laterally to a central position on the pocket wheel and then discharge the pairs of packages to the table 33 in a straight row. Referring to FIG. 10, the pockets receive the numbered packages from the right hand wheel 30 and receive the lettered packages from the left hand wheel 29. The pockets, after receiving the packages, move the packages from the right hand wheel to the left to central position, and move the packages from the left hand wheel to the right to central position, thus grouping the packages in the manner shown and above explained.

*Mechanism for transferring rows of packages to the cartoning machine*

As the packages are deposited on the table 33 they are engaged by transverse chains 130 and 131 which assist in moving them transversely of the table 33 and the end package of each grop engages a stop wall 132. After the packages have been alined in a row across the table 33, they are engaged by one of the feed bars 34 carried by the chains 35 and are fed into a cartoning machine 133.

The feed chains 35 are mounted on shafts 136 and 137, which are carried by an elongated supporting block 138, which is pivoted on the shaft 137. Shaft 137 is mounted on the upper end of a bar or block 139, which in turn is pivoted at its lower end on a shaft 140. Thus, the block 138, feed chains 35, and bar 139, can be swung upwardly and away from the machine frame to give access to the table 33 and other parts of the machine.

Shaft 140 is driven by a bevel gear connection 141, 142 from a shaft 143 and a sprocket wheel on the shaft 140 is connected by a drive chain 144 to a sprocket wheel on the shaft 137, as shown. Shaft 143 has rotatably mounted thereon, a spur gear 145, which is driven by a gear 146 mounted on a shaft 147 which is driven from the drive of the cartoning machine.

Gear 145 meshes with a gear 148 mounted on a shaft 149 which is connected by a sprocket and chain drive 150, 151, 152 to drive the shaft 84 which drives the pocket wheel 32.

Figure 8:
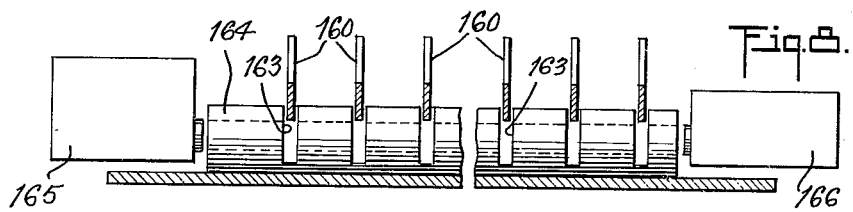
FIG. 8 is a plan view, partly in section, taken substantially on line 8—8 of FIG. 7, looking in the direction of the arrows.
Figure 7:
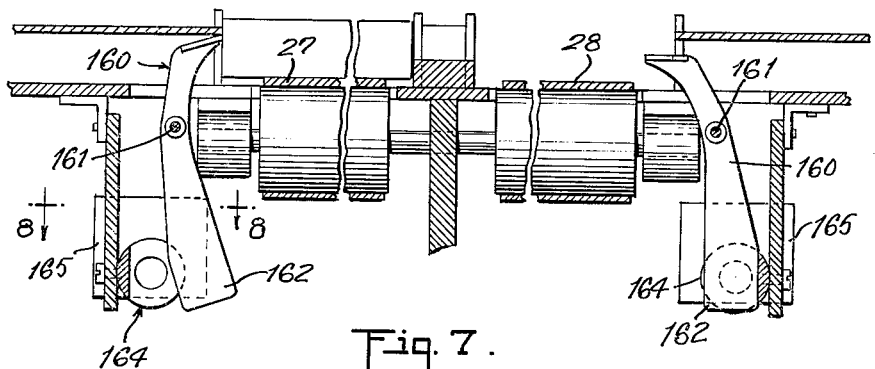
FIG. 7 is a transverse sectional elevation taken substantially on line 7—7 of FIG. 6, looking in the direction of the arrows.

The pocket wheel 32 is driven continuously but the wheels 29 and 30, the drive for the chains 35, and the feed for the carton blank are all controlled by feelers, shown particularly in FIGS. 6, 7 and 8.

*Feelers and clutch control*

Feelers 160 are provided at one side of each of the conveyors 27 and 28 and are pivoted on rods 161 so that the lower ends of the feelers, shown at 162, by reason of their weight relative to the top ends, swing the tops of the feelers inwardly above the conveyors, unless the tops are engaged by packages being fed on the conveyors in the manner shown in FIG. 7 at the left. The feelers 160 have their lower ends 162 disposed opposite slots 163 formed in tubes 164. At both ends of the tubes 164 are mounted photoelectric cells 165 and 166 and a beam of light is normally projected through the tubes. However, when there is a gap in the packages fed by either conveyor, one of the feelers will swing to the position shown at the right in FIG. 7, interrupting the beam.

Figure 11:
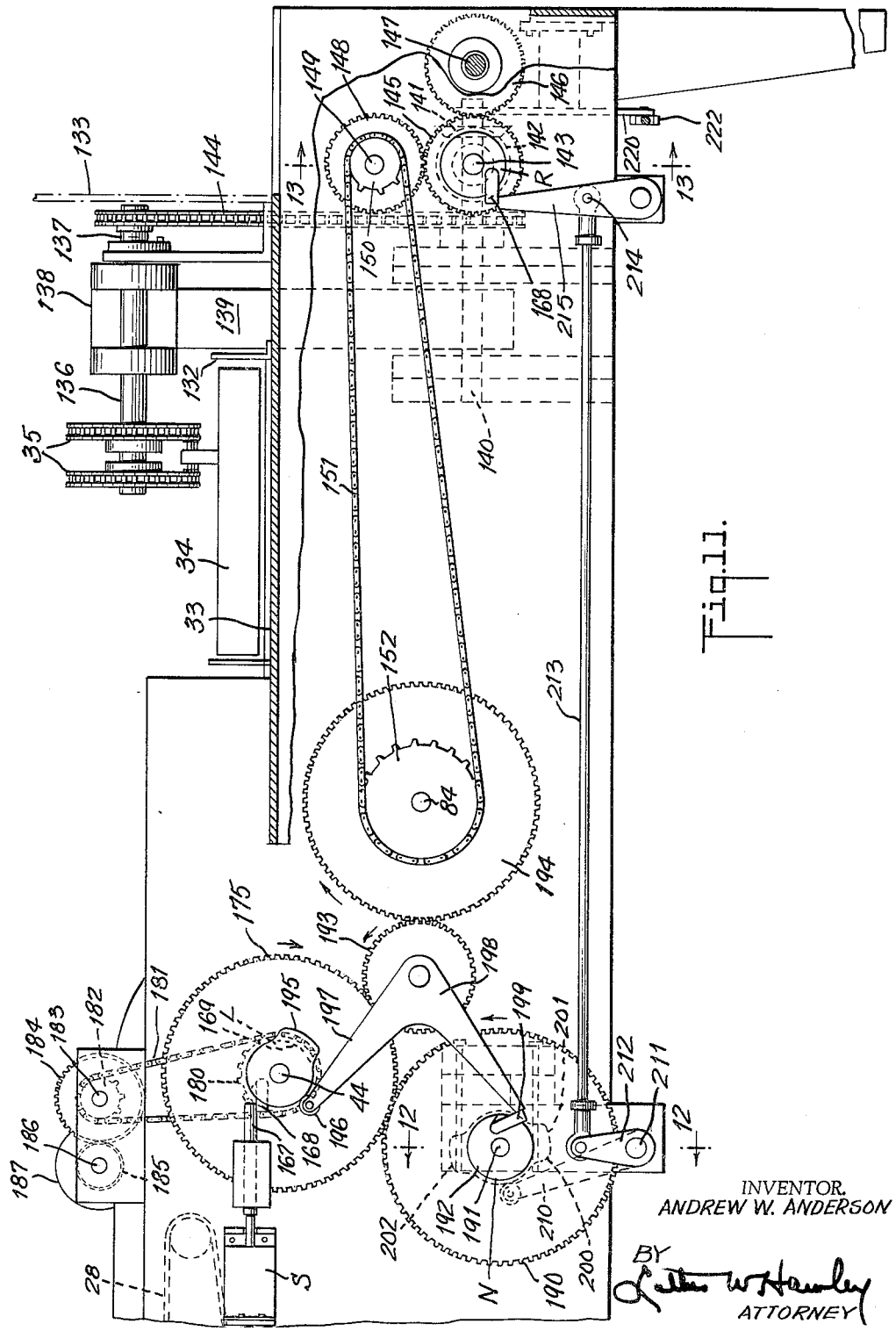
FIG. 11 is an elevational view on an enlarged scale showing the front end of the machine illustrated in plan in FIG. 4 and illustrating the driving and clutch control mechanism for the various operations.

The beam of light controls the operation of a solenoid S, shown particularly on FIGS. 1, 4 and 11. When the beam is interrupted, the solenoid plunger 167 is actuated to the right, viewing FIG. 11, thus pushing the right hand end of the plunger into the path of movement of a finger 168 which extends into the casing of a clutch 169. Inside the clutch an arcuate pawl 170 is controlled by the finger 168, as shown in FIG. 15.

As hereinafter described, there are a pluarlity of these clutches and clutch controls, and in each case the clutch casing is driven continuously and this drive is interrupted only when the finger 168 comes into contact with a stop which rotates the finger against the action of a spring 171. The spring 171 normally holds the pawl 170 in the position shown in FIG. 15 in full lines, which drives the shaft controlled thereby, as, for instance, shaft 143 at the right in FIG. 11.

Each of the feed wheel shafts 43 and 44 has a clutch 169 between its driving gear 175 and the shaft so that in case the feed on either of the conveyors 27 or 28 is interrupted the electric eye control will so operate the clutch as to disconnect the drive from the shaft. For instance, in FIG. 11 the plunger 167 has been moved to the right in a position to engage the finger 168, thus operating the pawl in the clutch in a manner to disconnect the drive to the shaft 44.

In FIG. 11 it will be noted that the shaft 44 through a sprocket wheel 180 drives a chain 181, which in turn drives a sprocket wheel 182 mounted on a shaft 183, which has also mounted thereon a spur gear 184 which meshes with a gear 185 mounted on a shaft 186. The shaft 186 has mounted thereon a pair of resilient rollers 187 which resiliently press down on the packages being fed by the conveyors 27 and 28.

When the clutch which is controlled by the plunger 167 is disconnected from the shaft 44, the drive to the rollers 187 is interrupted. FIG. 11 illustrates the drive to the wheel 30 from which the roller 187 is driven. The companion roller is driven by a separate shaft and separate driving connections and is controlled by the operation of another solenoid.

Referring again to FIG. 11, it will be noted that the gear 175 meshes with a gear 190 mounted on a shaft 191. The shaft 191 is driven by the gear 190 through a clutch N similar to the clutch above described. This clutch is controlled in the following manner. Gear 190 is driven from the gear 175 and gear 175 is driven through an idler 193 which is driven by a gear 194 on shaft 84.

A cam 195 is mounted on the shaft 44 and is engageable with a roller 196 carried by one end 197 of a bell crank lever 198. The other end of the lever 198 engages a finger 199 of the clutch N. As the cam 195 tilts the bell crank lever, the lower end of the bell crank lever will move out of the path of movement of fingers 199, thus permitting the gear 190 to drive the shaft 191.

The shaft 191 has mounted thereon a cam 200 having diametrically opposed outwardly extending cam lugs 201 and 202. The shaft 191 also has secured to its inner end a bevel gear 203 which forms a part of a differential comprising bevel gears 204 and 205 mounted on stub shafts 206 and 207 carried by a differential frame. The gears 204 and 205 are freely rotatable on the shafts 206 and 207 and mesh with a bevel gear 208 carried by a shaft 209. The shaft 209 is connected to the shaft 43 of the other feed wheel through gearing similar to the gears 175 and 190 for the shaft 44, as shown in FIG. 11. Also, the cams and levers and clutches shown in FIG. 11 are duplicated for the shaft 43, as shown in FIGS. 1 and 4.

The purpose of the differential shown in FIG. 12 is to control the operation of the cam 200.

Referring to FIG. 12, when the drive to the feed wheel 30 is interrupted by the feelers which coact with the conveyor 28, the shaft 44 for the feed wheel 30 stops rotating and the shaft 191 is also stopped. Thus, the bevel gear 203 stops rotating and the bevel gear frame which carries the gears 204 and 205 will rotate around the bevel gear 203 at one half the normal speed of rotation, being driven by the shaft 209 in the bevel gear 208. The bevel gear frame has mounted thereon the cam 200 and drives this cam which in a manner about to be described controls the drive for the transverse feed chains 35.

Recapitulating, the differential operates in the following manner to control the rotation of the cam 200 and through this cam to control the clutch for the shaft 143. When the bell crank lever 198 is disposed in the position shown in FIG. 11, the clutch on the shaft 191 is held against rotation, thus holding the gear 203 stationary. The shaft 209 and gear 208 will operate but will rotate the differential block or frame at one half of its normal speed, thus through the driving connections already described operating the shaft 137 and the chains 35 at one half of their normal speed, slowing down the operation of the transfer of the rows of packages across the table 33 and to the cartoning machine. This slow down movement will take place when either of the feed wheels 29 or 30 has been stopped by reason of the fact that there is not a continuous line of packages being fed on the conveyors 27 and 28. When both feed wheels are operating, the cam 195 will oscillate the bell crank lever 198 and will release the finger 199, causing the cam 200 to rotate with the following results.

Cam 200 on each rotation thereof in its normal operation causes both lugs 201 and 202 to oscillate an arm 210 mounted on a stub shaft 211, on which is also mounted an arm 212 which engages at its outer end a rod 213, the opposite end of which is pivoted at 214 to an arm 215, which is adapted to engage the finger 168 on the control clutch mounted on the shaft 143. The shaft 143 drives the shaft 140 through bevel gears 141 and 142 and the shaft 140 is connected by a chain 144 to drive the shaft 137, which in turn drives the chains 35.

Thus, when one wheel 29 or 30 stops operating the condition shown in FIG. 11 takes place and through the differential, in the manner just described, the cam shaft 191 operates only one half as fast and, therefore, through the arms 210, 212, rod 213 and arm 215 the clutch on the shaft 143 is controlled to operate the shaft 143 at half speed and through the connections above described to operate the feed chains 35 at half speed.

The reason for this operation is that it takes twice as long to get a full row of articles across the table when one of the feed wheels is not operating.

When one of the feed wheels is not operating it is also necessary to control the blank feed in the cartoning machine in such a manner as to feed a blank only one half as often. This is accomplished in the following manner. The shaft 143 has mounted thereon a cam 218 which is engaged by a roller 219 on one end of a rocker arm 220 mounted on a fixed pivot 221. The other end of the arm 220 is connected to a rod 222 at one end of the rod and the other end of the rod is connected to an arm 223 on a stub shaft 224 having a crank 225 connected at one end of a rod or pitman 226, the other end of the rod 226 being pivoted to a crank 227 which is mounted on a stub shaft 228 which carries an arm 229. This arm controls one of the clutches 169 in a manner hereinbefore described, thus interrupting the operation of a feed roller 230 which feeds the blank 36 downwardly in the cartoning machine. It is obviously necessary to interrupt this feed since when one of the feed wheels is not operating it takes twice as long to get a full row of articles across the table and to feed these articles to the cartoning machine.

Although the clutches in the above description are all alike and operate in the same manner and the details of the clutches have been given the same reference characters, in order to distinguish and identify the different clutches they are indicated by letters. The clutch for the feed wheels are designated L and M, two clutches being provided since these feed wheel shafts are driven by separate operating connections. The clutch on the shaft 191 is designated N and the clutch on the corresponding shaft 209 on the opposite side of the machine is designated P. The clutch on the shaft 143 is designated R and the clutch on the cartoning machine feed shown in FIG. 13 is designated T.

The various operations carried out on the machine may be briefly summarized as follows. When both lines of packages on the conveyors 27 and 28 are full, both feed wheels operate to feed the packages to the pocket wheel on which the packages are moved laterally to central position and from which they are fed to the table 33. They are removed from the table by the feed bars 34 on the chains 35 and are fed to the cartoning machine. However, when one of the feed wheels is interrupted in its operation, due to the lack of a complete line of packages on one of the conveyors, the clutches above described will be operated through the solenoids to slow down the operation of the transverse feed across the table, the operation of the resilient pressure rollers on the top of the packages, and the operation of the blank feed in the cartoning machine.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a machine of the character described,
    (a) means comprising a pair of conveyors for feeding packages,
    (b) means for receiving, stacking and feeding said packages in pairs, comprising a pair of feed wheels, each of said feed wheels receiving packages from said conveyors,
    (c) means for feeding and delivering said pairs of packages and grouping said pairs in groups consisting of a predetermined number of pairs arranged, in a row, side by side in a line,
    (d) means operable intermittently for discharging said groups of pairs of packages,
    (e) said means recited in (c) comprising a rotatable wheel having laterally movable and tiltable pockets,
    (e') means for tilting said pockets during rotation of the rotatable wheel so as to facilitate discharge of the packages,
    (f) and means for moving said pockets laterally during rotation of the pocket rotatable wheel so as to facilitate discharge of the packages.

2. In a machine of the character described,
    (a) a pair of package feeding conveyors, a rotatable member in line with said conveyors and having ledges for receiving and delivering the packages in pairs,
    (b) a rotatable member positioned adjacent to said first named rotatable member and in the path of movement of the packages discharged thereby and having tiltable and laterally movable pockets for receiving said pairs of packages from said first named rotatable member,
    (c) means for moving said pockets laterally and tilting them during their rotation to a central delivery position to deliver the pairs of packages in a line, side by side,
    (d) and means for moving said grouped packages laterally from their delivery position,
    (d') means for tilting said pockets during rotation of the second named rotatable member so as to facilitate discharge of the packages,
    (e) said means recited in (b) and (c) including means for spacing the delivery of the packages in a group, disposed side by side.

3. In a machine of the character described,
    (a) a pair of substantially parallel conveyors,
    (b) a pair of feed wheels in line with the delivery ends of said conveyors, each of said feed wheels receiving packages from said conveyors,
    (c) said wheels having ledges for receiving and feeding packages from said conveyors,
    (d) a wheel having laterally movable and tiltable pockets for receiving the packages from said wheels and adapted to deposite the packages in a line,
    (d') means for tilting said pockets during rotation of the said wheel so as to facilitate discharge of the packages,
    (e) detector means for each of said conveyors,
    (f) means for driving said wheels,
    (g) and means controlled by said detector means and set in operation when said detector means detects the absence of a package on a conveyor for disconnecting the drive from the wheel receiving packages from said conveyor.

4. In a machine of the character described,
    (a) a pair of conveyors for feeding two lines of packages,
    (b) a pair of feed wheels for receiving the packages from said conveyors, each of said feed wheels receiving packages from one of said conveyors,
    (c) a pocket wheel having laterally movable and tiltable pockets at the two ends thereof for receiving the packages from said wheels,
    (d) means for moving said pockets, from their package receiving positions, laterally to a central discharge position so as to position the packages centrally of the pocket wheel,
    (d') means for tilting said pockets during rotation of the pocket wheel so as to facilitate discharge of the packages,
    (e) means for feeding said discharged packages, arranged in a row, to a cartoning machine,
    (f) operative driving connections for driving said feed wheels,
    (g) means associated with each conveyor and operable when the row of packages on one of the conveyors is incomplete, for disconnecting the operative driving connections to the wheel receiving packages from said conveyor,
    (h) and means operable under the conditions outlined in (g) for slowing down the operation of the delivery means recited in (e).

5. In a machine of the character described,
    (a) a pair of conveyors for feeding two lines of packages,
    (b) a pair of feed wheels for receiving the packages from said conveyors, each of said feed wheels receiving packages from one of said conveyors,
    (c) a pocket wheel having laterally movable and tiltable pockets at the two ends thereof for receiving the packages from said wheels,
    (d) means for moving said pockets, from their package receiving positions, laterally so as to position the packages centrally of the pocket wheel,
    (d') means for tilting said pockets during rotation of the pocket wheel so as to facilitate discharge of the packages,
    (e) a cartoning machine positioned adjacent the discharge end of the package feeding and aligning machine arranged to receive the packages discharged from said pockets,
    (f) means for feeding said discharged packages, arranged in a row, to a cartoning machine,
    (g) blank feeding means in the cartoning machine,
    (h) and means associated with each conveyor and operable when the row of packages on either conveyor is interrupted for slowing down the operation of the transfer of the packages to the cartoning machine.

6. In a machine of the character described,
    (a) a pair of conveyors for feeding two lines of packages,
    (b) a pair of feed wheels for receiving the packages from said conveyors, each of said feed wheels receiving packages from one of said conveyors,
    (c) a pocket wheel having laterally movable and tiltable pockets at the two ends thereof for receiving the packages from said wheels,
    (d) means for moving said pockets, from their package receiving positions, laterally so as to position the packages centrally of the pocket wheel,
    (d') means for tilting said pockets during rotation of the pocket wheel so as to facilitate discharge of the packages,
(e) means for feeding said discharged packages, arranged in a row, to a cartoning machine,
(f) means associated with each conveyor and operable when the row of packages on one of the conveyors is incomplete, for disconnecting the operative driving connections to the wheel receiving packages from said conveyor,
(g) means operable under the conditions outlined in (f) for slowing down the operation of the delivery means recited in (e),
(h) a cartoning machine positioned adjacent the discharge end of the package feeding and aligning machine arranged to receive the packages discharged from said pockets,
(i) and means associated with each conveyor and operable when the row of packages on either conveyor is interrupted for slowing down the operation of the transfer of the packages to the cartoning machine.

7. In a machine of the character described,
(a) means comprising a pair of conveyors for feeding packages,
(b) means for receiving, stacking and feeding said packages in pairs,
(c) means for feeding and delivering said pairs of packages and grouping said pairs in groups consisting of a predetermined number of pairs arranged, in a row, side by side in a line,
(d) means operable intermittently for discharging said groups of pairs of packages,
(e) said means recited in (c) comprising a pair of rotatable wheels each of said rotatable wheels receiving packages from one of said wheels, having laterally movable and tiltable pockets,
(e') a pocket wheel,
(f) means for moving said pockets laterally during their rotation,
(f') means for tilting said pockets during rotation of the pocket wheels so as to facilitate discharge of the packages,
(g) and means for tilting said pockets during the rotation of the pocket wheel so as to permit discharge of the packages from said pocket wheel.

References Cited by the Examiner
UNITED STATES PATENTS

| | | | |
|---|---|---|---|
| 2,630,951 | 3/53 | Slightam | 53—26 |
| 2,905,341 | 9/59 | Anderson | 214—6 |
| 3,086,334 | 4/63 | Griner et al. | 53—159 X |
| 3,139,915 | 7/64 | Minard | 53—55 X |

FRANK E. BAILEY, *Primary Examiner.*
ROBERT A. LEIGHEY, *Examiner.*